United States Patent
Pfertner et al.

(10) Patent No.: US 6,513,857 B2
(45) Date of Patent: Feb. 4, 2003

(54) LOWERABLE REAR WINDOW, PARTICULARLY A SOLID-GLASS WINDOW, FOR A FOLDING TOP IN A MOTOR VEHICLE

(75) Inventors: Kurt Pfertner, Wimsheim (DE); Mathias Fröschle, Ostfildern (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/931,405

(22) Filed: Aug. 17, 2001

(65) Prior Publication Data
US 2002/0024230 A1 Feb. 28, 2002

(30) Foreign Application Priority Data
Aug. 24, 2000 (DE) .......................................... 100 41 487

(51) Int. Cl.⁷ ................................................... B60J 7/00
(52) U.S. Cl. ............................ 296/107.07; 296/146.14; 296/107.08
(58) Field of Search ....................... 296/102.07, 146.14, 296/116, 201, 107.12, 107.09, 108

(56) References Cited

U.S. PATENT DOCUMENTS

| | | | | | |
|---|---|---|---|---|---|
| 2,833,593 | A | * | 5/1958 | Olivier et al. | 296/107.07 |
| 3,236,557 | A | * | 2/1966 | Podolan | 296/107.07 |
| 3,332,169 | A | * | 7/1967 | Lohr et al. | 296/146.14 |
| 3,333,362 | A | * | 8/1967 | Kostin et al. | 296/146.14 |
| 4,543,747 | A | * | 10/1985 | Kaltz et al. | 296/146.14 |
| 4,572,570 | A | * | 2/1986 | Trucco | 296/107.07 |
| 4,693,509 | A | | 9/1987 | Moy et al. | |
| 4,778,215 | A | * | 10/1988 | Ramaciotti | 296/107.07 |
| 4,784,428 | A | * | 11/1988 | Moy et al. | 296/107.07 |
| 4,852,935 | A | * | 8/1989 | Varner | 296/107.07 |
| 5,209,544 | A | * | 5/1993 | Benedetto et al. | 296/146.14 |
| 5,267,770 | A | * | 12/1993 | Orth et al. | 296/107.07 |
| 5,375,901 | A | * | 12/1994 | Agosta et al. | 296/146.14 |
| 5,746,470 | A | * | 5/1998 | Seel et al. | 296/108 |
| 5,788,316 | A | * | 8/1998 | Rothe | 296/107.07 |
| 5,887,936 | A | * | 3/1999 | Cowsert | 296/107.07 |
| 5,988,729 | A | * | 11/1999 | Klein | 296/107.07 |
| 6,095,589 | A | * | 8/2000 | Kinnanen et al. | 296/107.09 |
| 6,123,381 | A | * | 9/2000 | Schenk | 296/107.07 |
| 6,199,936 | B1 | * | 3/2001 | Mac Farland | 296/107.08 |
| 6,270,143 | B1 | * | 8/2001 | Heselhaus et al. | 296/107.07 |
| 6,283,532 | B1 | * | 9/2001 | Neubrand | 296/107.07 |
| 6,299,234 | B1 | * | 10/2001 | Seel et al. | 296/107.12 |
| 6,302,470 | B1 | * | 10/2001 | Maass et al. | 296/107.07 |
| 6,322,131 | B1 | * | 11/2001 | Maass et al. | 296/107.07 |
| 2002/0005653 | A1 | * | 1/2002 | Heselhaus et al. | 296/107.07 |
| 2002/0017801 | A1 | * | 2/2002 | Salz et al. | 296/107.07 |

FOREIGN PATENT DOCUMENTS

| | | |
|---|---|---|
| DE | 3416330 A1 | 11/1985 |
| DE | 38 08910 A1 * | 10/1989 |
| DE | 43 09 607 A1 | 9/1994 |
| DE | 29513595 U1 | 11/1995 |
| DE | 3808910 C2 | 12/1996 |
| DE | 19540742 A1 | 5/1997 |
| DE | 19753209 C1 | 2/1999 |
| EP | 0 246 201 A1 * | 3/1987 |
| EP | 0 246 201 A1 | 11/1987 |
| EP | 0 332 812 A2 | 9/1989 |
| JP | 4 11516 * | 1/1992 |

* cited by examiner

Primary Examiner—Kiran Patel
(74) Attorney, Agent, or Firm—Crowell & Moring LLP

(57) ABSTRACT

A lowerable rear window in a folding top has a window which, during opening of the folding top, can be lowered about a horizontal axis into a depositing space of the vehicle. Lateral steering levers which are guided corresponding to the movement of the folding top during opening and closing are used for guiding the rear window. The rear window reaches directly under a vehicle body element without the need for a connection made of a folding top cover between the vehicle body element and the rear window.

4 Claims, 9 Drawing Sheets

LOWERABLE REAR WINDOW, PARTICULARLY A SOLID-GLASS WINDOW, FOR A FOLDING TOP IN A MOTOR VEHICLE

This application claims the priority of German application 100 41 487.7, filed Aug. 24, 2000.

BACKGROUND AND SUMMARY OF THE INVENTION

The present invention relates to a lowerable rear window, particularly a solid-glass window, for a folding top in which the rear window is changeable from a closed folding top position into a lowered folding top position and vice versa.

A folding top having a rear window made of glass which can be swivelled by way of lateral supporting members around a transverse axis is known from German Patent Document DE 38 08 910 C2. The rear window can take up a closed position as well as an open position, in which the rear window is deposited in a receiving compartment.

It is one object of the invention to provide an improved lowerable rear window, which may be a solid-glass window, which can be changed in a simple manner from a closed position into an open position and back. Tightness is ensured in the closed position, and changing of the rear window into the open position takes place by way of few additional components.

According to the invention, bearing points by which at least one horizontal bearing axis is formed are provided at a lower transversely extending edge of the rear window. The rear window is swivelable on a body side about bearing points, and at least one steering lever is provided on each side between lateral edges of the rear window and the vehicle body. A method of changing the position of the rear window is also claimed. Other advantageous characteristics are additionally reflected in the claims.

One advantage achieved by the invention is that the rear window, made of glass, can be deposited in a simple manner in a large-surface form in a vehicle space. For this purpose, the rear window can be swivelled on the vehicle body side about at least one horizontal bearing axis. This bearing axis is preferably formed at the lower transversely extending edge of the rear window or a surrounding frame of the rear window by way of bearing points on the vehicle. At least one steering lever is provided between the lateral edges of the rear window or the frame and the vehicle body on each side for supporting guidance of the rear window into individual positions. The steering lever can also be implemented by a belt, a connecting link, or similar devices.

It is also an advantage of the invention that the solid-glass window reaches by way of its rearward transversely extending edge or frame part under a vehicle body element. Seals are provided, between this vehicle body element and the edge or the frame, for sealing in the closed folding top position. The view toward the rear, therefore, is not impaired, because a large-surface viewing area is obtained. The rear window ends directly at the vehicle body element or on a folding top compartment lid. As a result, folding top fabric is not provided as a bridging between the rear window and the vehicle body element. This is also the case when the rear window is surrounded by a frame.

Linking of the rear window is provided by only a few steering levers and bearings. The rear window is restrictedly guided by way of a toggle joint formed of two steering levers. The two steering levers are connected by way of a cable pull with a swivellable main hoop or main control arm of the folding top in a restrictedly guided manner in the closed and open positions. Instead of a cable pull, a control arm or similar devices can be used.

The opening movement of the folding top essentially takes place by way of a swivellable main hoop as well as by way of a correspondingly swivellable main control arm. One steering lever is connected for this purpose with the cable pull which, because of the movement of the main hoop or of the main control arm, can carry out a corresponding movement. As a result of the folding top movement, the movement of the rear window is controlled. It is conceivable to link the folding top by way of devices other than the main hoop and the main control arm.

One spring element, respectively, is arranged in the vehicle-body-side bearing of one steering lever so that the control arm carries out a movement in the opening direction of the folding top. This spring element seeks to adjust the steering lever against the swivelling movement of the rear window in the lowered position of the rear window. The spring element may consist of a leg spring.

In order to achieve an optimal tightness between the vehicle body element or the folding top compartment lid, on the one hand, and the tensioning hoop, on the other hand, the window frame is arranged between the vehicle body element or the folding top compartment lid of the vehicle body and a transversely extending tensioning hoop linked to the vehicle body. The window frame rests on the front side against a seal of the tensioning hoop, and a transversely extending edge of the folding top compartment lid is connected on the underside with the seal.

The tensioning hoop itself is swivellably held on the vehicle body by way of levers. In this case, the tensioning hoop is swivellably linked by levers on the vehicle body side by way of bearings provided laterally on the vehicle body, and the bearings forming the horizontal swivelling axis for the solid glass window are provided on the tensioning hoop.

Instead of having the toggle joints on both sides, the rear window may have a lever of a different construction. The bearings at the tensioning hoop may, for example, also be provided on the rearward edge of the rear window and not laterally. A motor-driven adjustment of the rear window is also conceivable when the steering levers are eliminated; the motors then, for example, would form the lower transversely extending swivelling axis. Furthermore, the tensioning hoop may also be provided only laterally of the rear window.

An embodiment of the invention is illustrated in the drawings and will be described in detail.

DETAILED DESCRIPTION OF THE INVENTION

Figure 1:
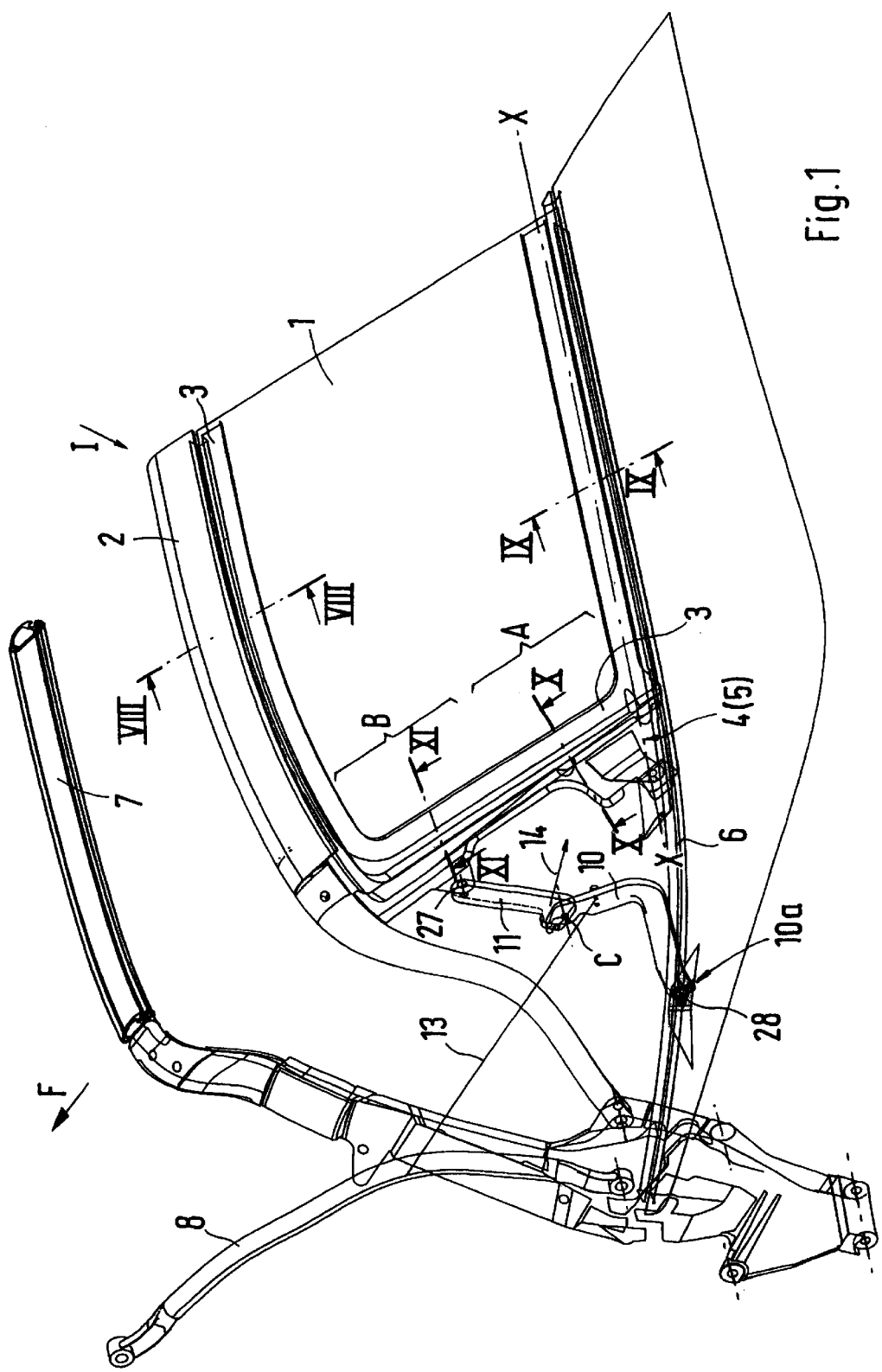
FIG. 1 is a diagrammatic representation of a rear window, without the folding top but in a closed position of the folding top, showing the corner hoop, the main hoop and the main control arm of the folding top, and the control arms and the horizontal swivelling axis of the rear window.
Figure 2:
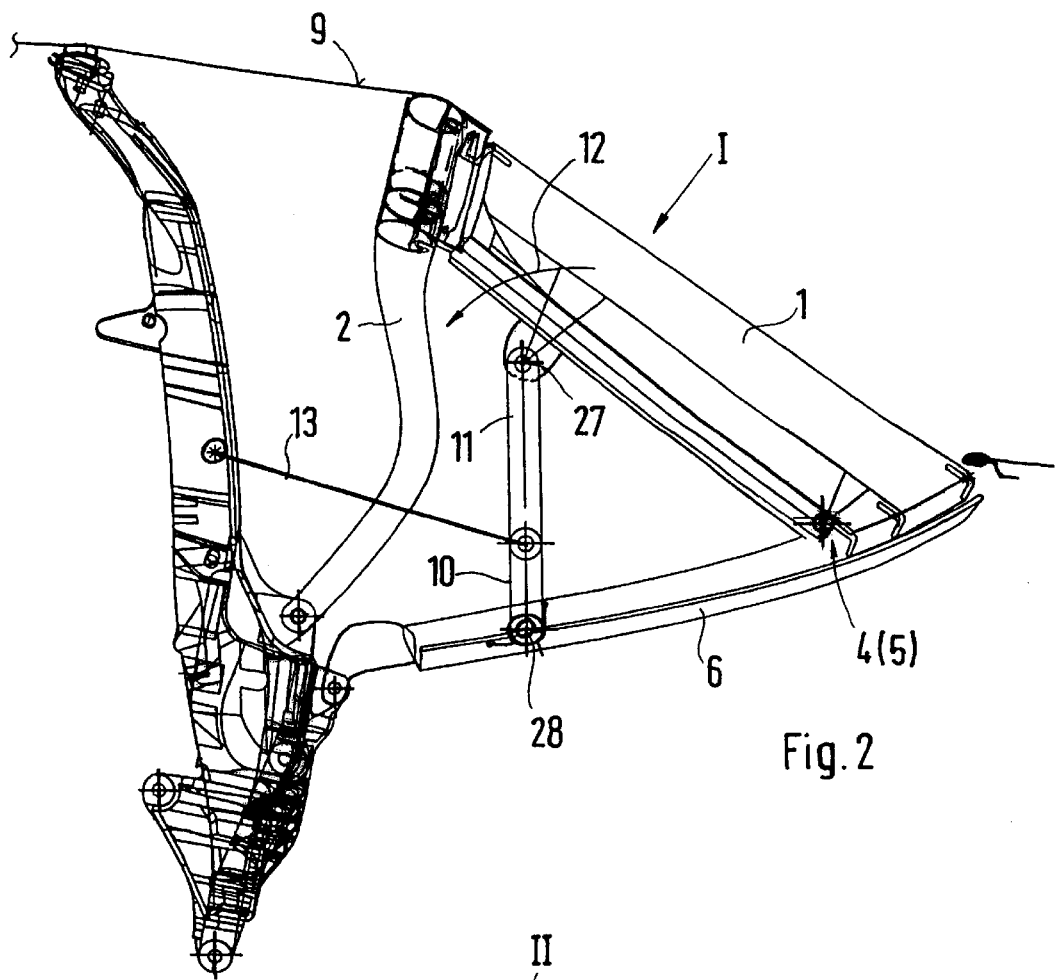
FIG. 2 is a schematic representation of the closed folding top with the rear window, the steering levers and the cable pull.

FIG. 1 shows a vehicle having a rear window 1 which is arranged in a folding top 9. The folding top 9 is illustrated in detail in FIG. 2, is connected with a corner hoop 2, and is supported on and partially connected with a main hoop 7. Furthermore, a swivellable main control arm 8 is provided for adjusting the folding top.

Figure 4:
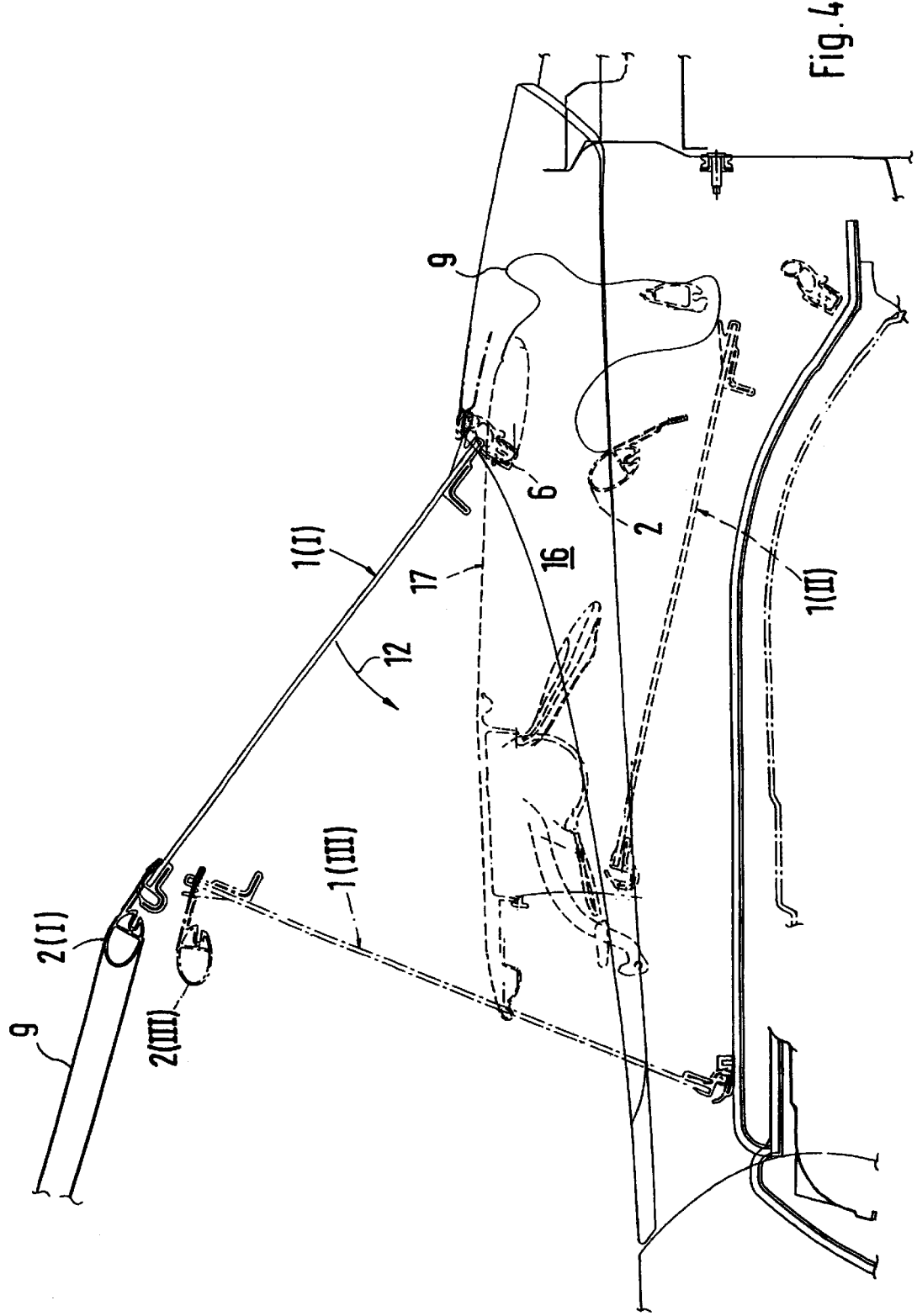
FIG. 4 is a schematic representation of possible positions of the rear glass window in the vehicle.

The construction, fastening, and controlling of the folding top 9 for the rear window 1 can also take place in a different manner. It is important to have the rear window 1 arranged as a solid-glass window, for example, in a frame 3 or disposed on the edge side without a frame 3 by way of lateral bearings 4, 5 on the vehicle body, for example, on a tensioning hoop 6. The rear window 1 is restrictedly guided for swivelling movement by way of steering levers 10, 11 on each side of the rear window 1. The possible positions I, II and III of the rear window 1 are schematically illustrated in FIG. 4.

Spraying around the rear window, for example, can also take place, and the pivots can also be screwed, glued, or fastened or arranged in a similar manner directly on the window without any frame.

Thus, the rear window 1 can take up a closed position I, in which the folding top 9 is closed, an open position II, and a servicing position III.

The rear window 1 is arranged between the tensioning hoop 6 and the corner hoop 2 and can be swivelled by way of the bearings 4, 5 on the tensioning hoop 6 about a horizontal axis X—X. The swivelling movement during deposition into the open position II (FIG. 3) from the closed position takes place in the direction of the arrow 12 or in the driving direction F.

In order to carry out this opening movement, the steering levers 10, 11 are provided, for example, on the frame 3 of the rear window 1, the steering lever 11 is swivellably linked to the window frame 3 in a bearing 11a, and the other steering lever 10 is swivellably linked to the tensioning hoop 6 in a bearing 10a.

The lower steering lever 10 is connected by way of a cable 13 or a similar transmission device with either the main hoop 7 or the main control arm 8. As a result of this connection with the cable 13, the pair of steering levers 10, 11 can swivel in the direction of the arrow when the folding top 9 is opened and can initiate the depositing movement of the rear window 1. A spring element 15, such as a leg spring, is arranged in the bearing 10a of the lower steering lever 10 so that the pair of steering levers 10, 11 can carry out this movement automatically. The leg spring seeks to swivel the pair of steering levers 10, 11 when the main hoop 7 or the main control arm 8 swivels into an opening movement against the driving direction F.

Figure 3:
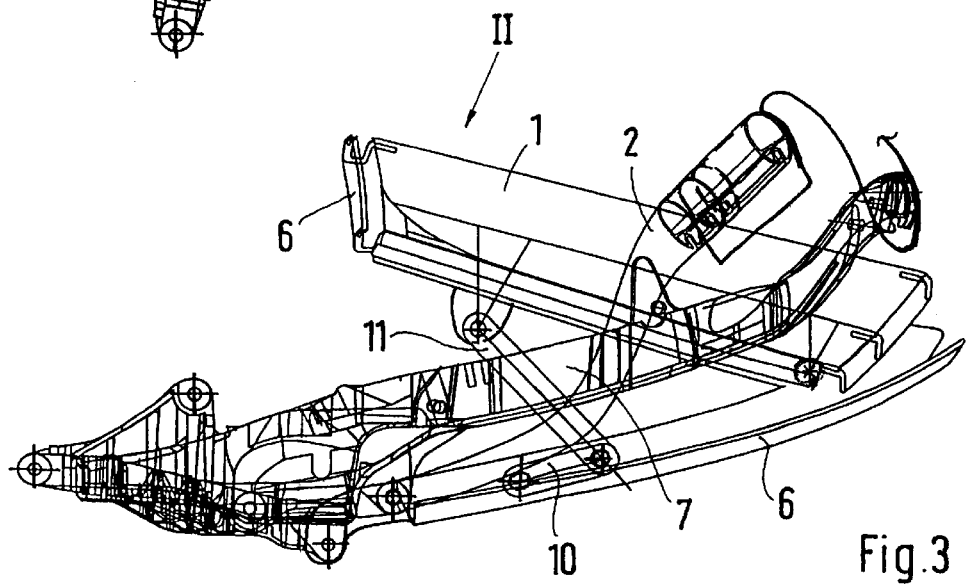
FIG. 3 is a schematic representation of the open folding top with the deposited rear window.

As FIG. 3 illustrates in detail, the rear window 1 is deposited in a receiving space 16 of the vehicle and is closed off by the receiving compartment lid 17. The taking-up of the positions of the rear window 1 is a function of the movement sequence of the folding top 9 so that, while closing the folding top 9, the rear window 1 is erected again, as illustrated in detail in FIG. 2. This means the cable pull 13 is pulled and again takes along the steering levers 10, 11, and the rear window 1 is pulled into its sealing devices.

FIGS. 8 to 11 are cross sectional views of the rear window 1 when the folding top is in the closed position as shown in FIG. 1.

Figure 8:
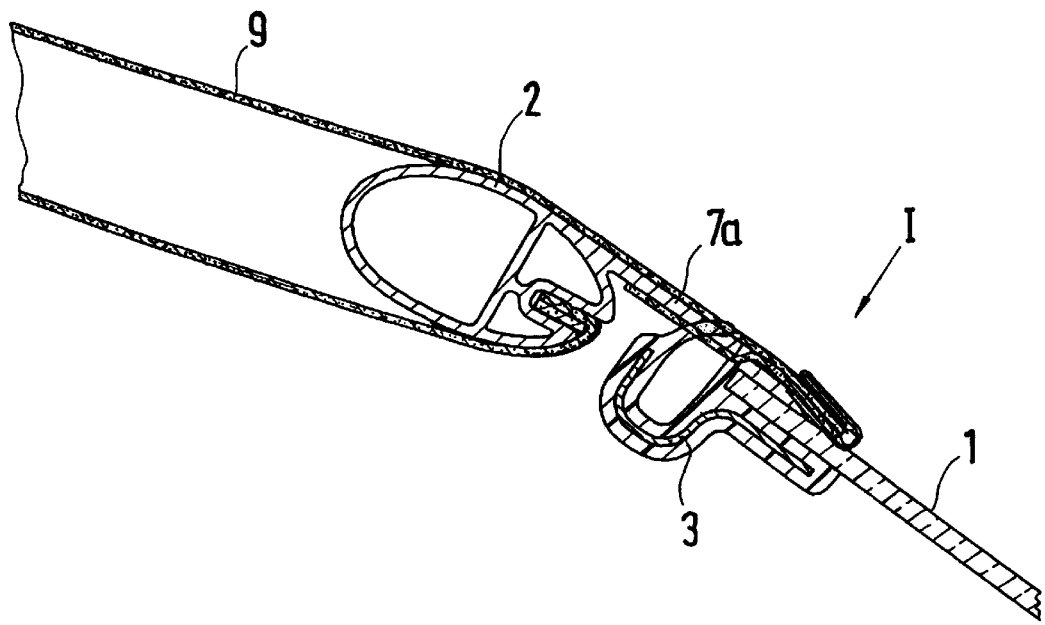
FIG. 8 is a sectional view of the upper edge or frame with the rear window as seen along line VIII—VIII of FIG. 1.

FIG. 8 is a cross-sectional view of the upper transversely extending frame 3 of the rear window 1 and the main hoop 7. The frame 3 is placed firmly and tightly against the rigid leg 7a of the main hoop 7. The leg 7a is released again from the frame 3 while the folding top is opening.

Figure 9:
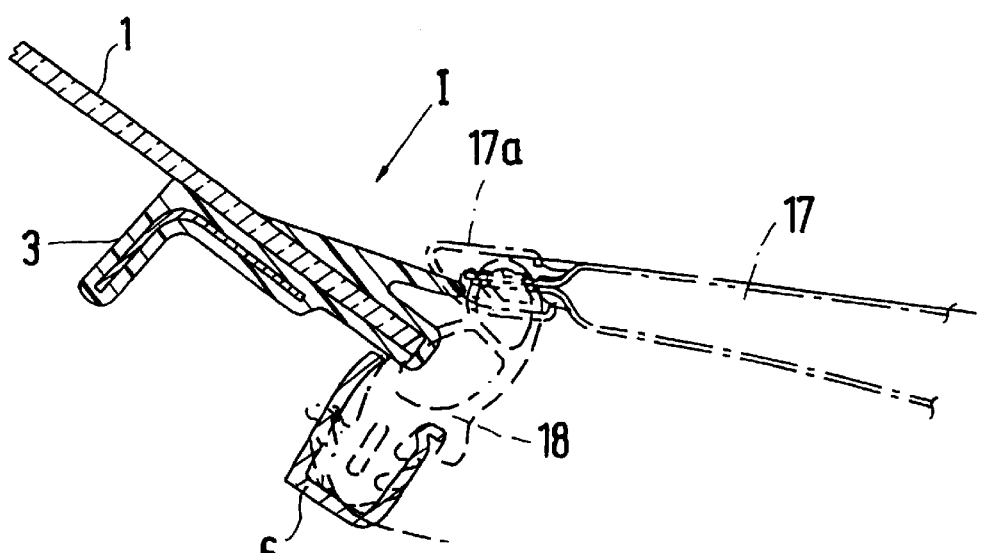
FIG. 9 is a sectional view of the lower edge or frame with the rear window as seen along line IX—IX of FIG. 1.

FIG. 9 is a cross-sectional view of the lower transversely extending frame 3 which is arranged between the lid 17 and the tensioning hoop 6. The frame is held in a sealed manner by way of a sealing device 18 directly on the lid or on the hoop. When the folding top 9 is opened, the frame 3 is released again from this sealing device 18.

Figure 10:
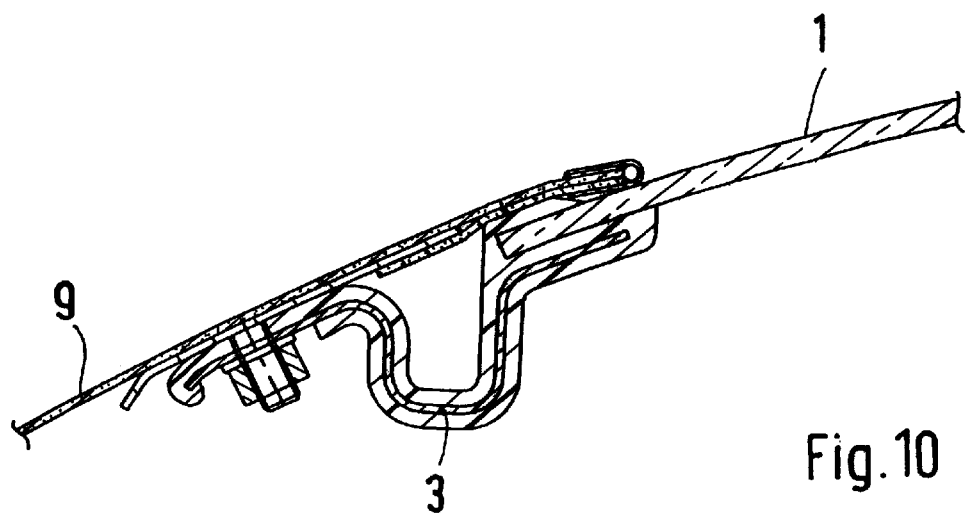
FIG. 10 is a sectional view of the lower lateral edge or frame with the rear window as seen along line X—X of FIG. 1.

FIG. 10 is a cross-sectional view of a lateral area of the frame 3, specifically in the lower section A. In this section A, the fabric of the folding top 9 is fixedly connected with frame 3 and thus also the rear window 1.

Figure 11:
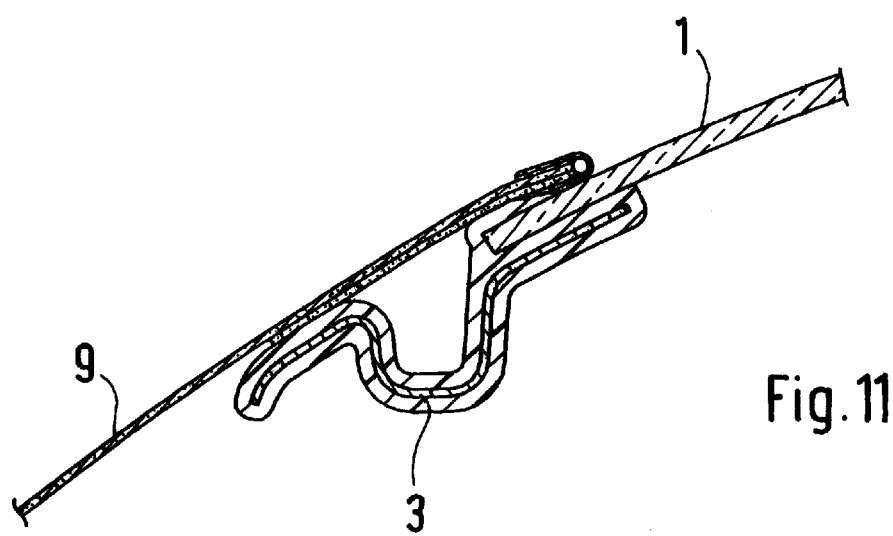
FIG. 11 is a sectional view of the upper lateral edge or frame with the rear window as seen along line XI—XI of FIG. 1.
Figure 12:
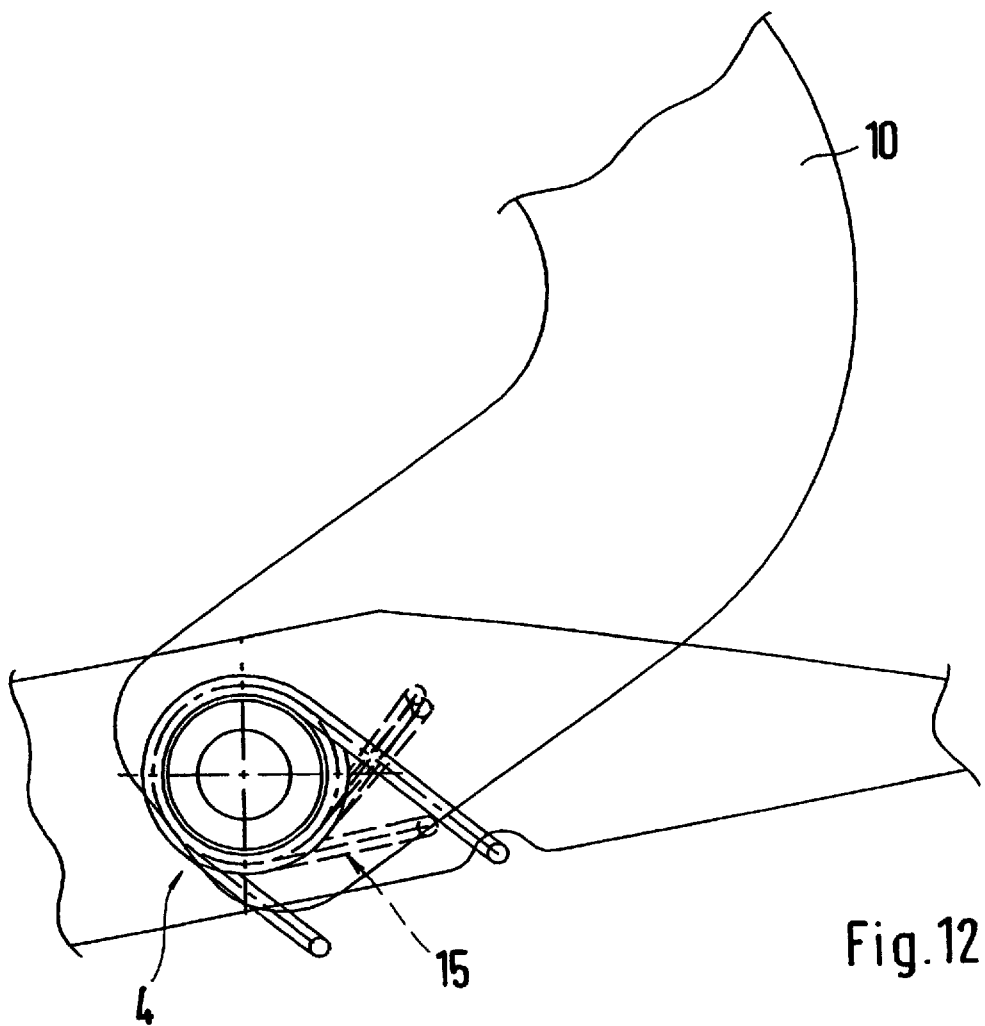
FIG. 12 is an enlarged representation of the lower control arm with the spring element.

FIG. 11 is a cross-sectional view of another lateral area of the frame 3, specifically in the upper section B. In this section B, the fabric of the folding top 9 is not connected with the frame 3 so that, during an opening movement of the folding top 9 and thus a swivelling of the rear window 1, the latter detaches from the folding top 9 and is released.

Figure 5:
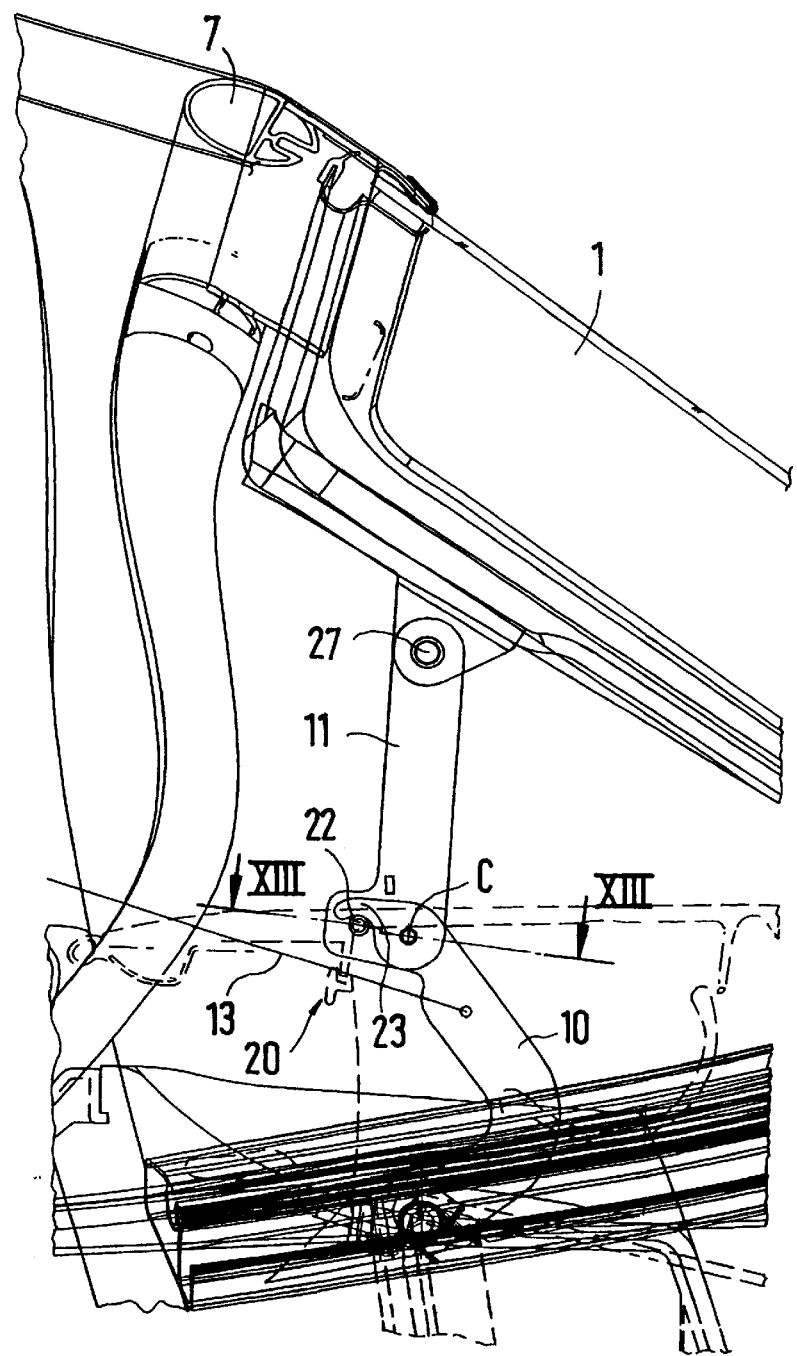
FIG. 5 is a lateral view of the steering levers with the locking device.
Figure 6:
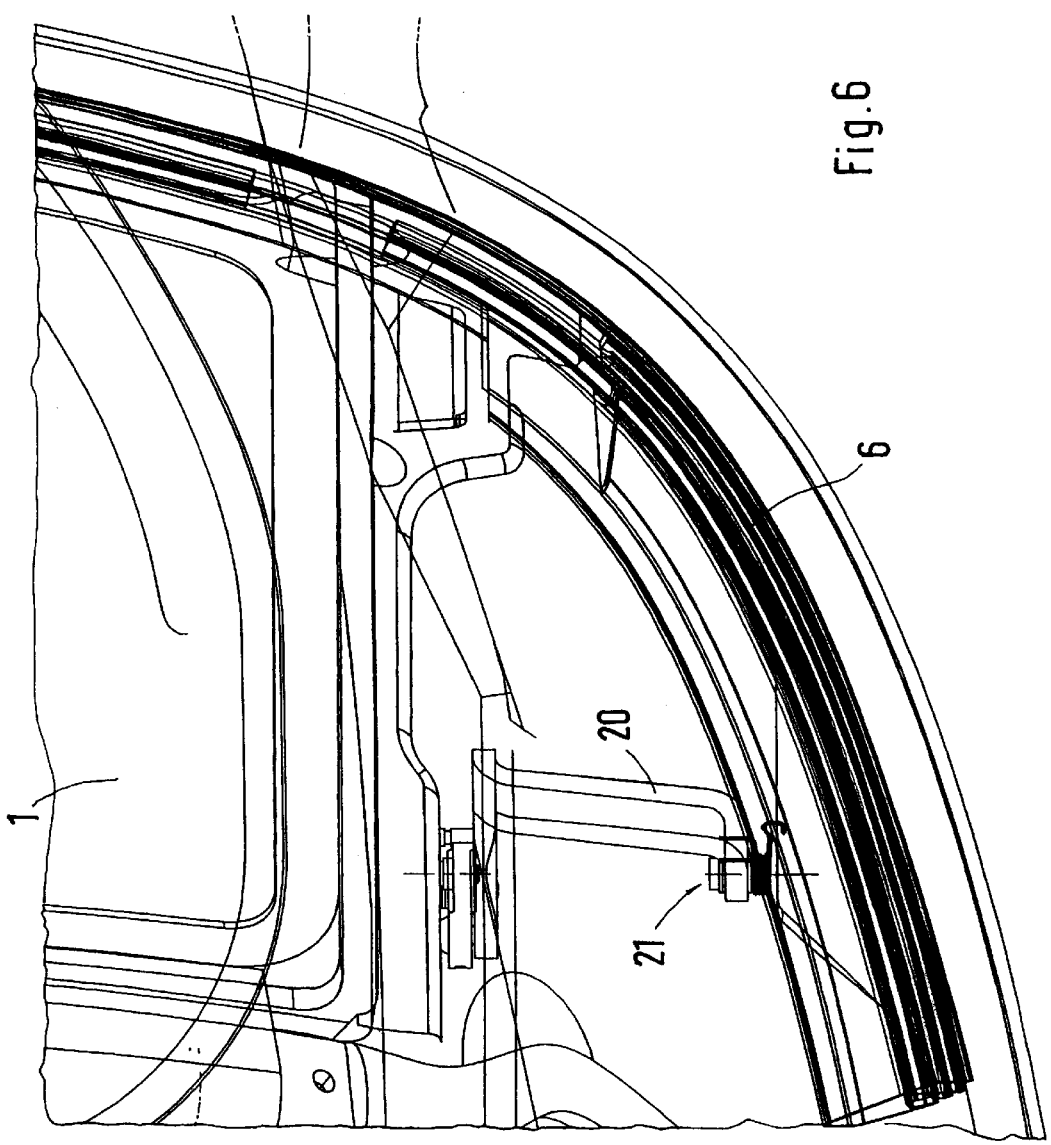
FIG. 6 is a top view of a tensioning hoop with the linkage to the vehicle body.
Figure 7:
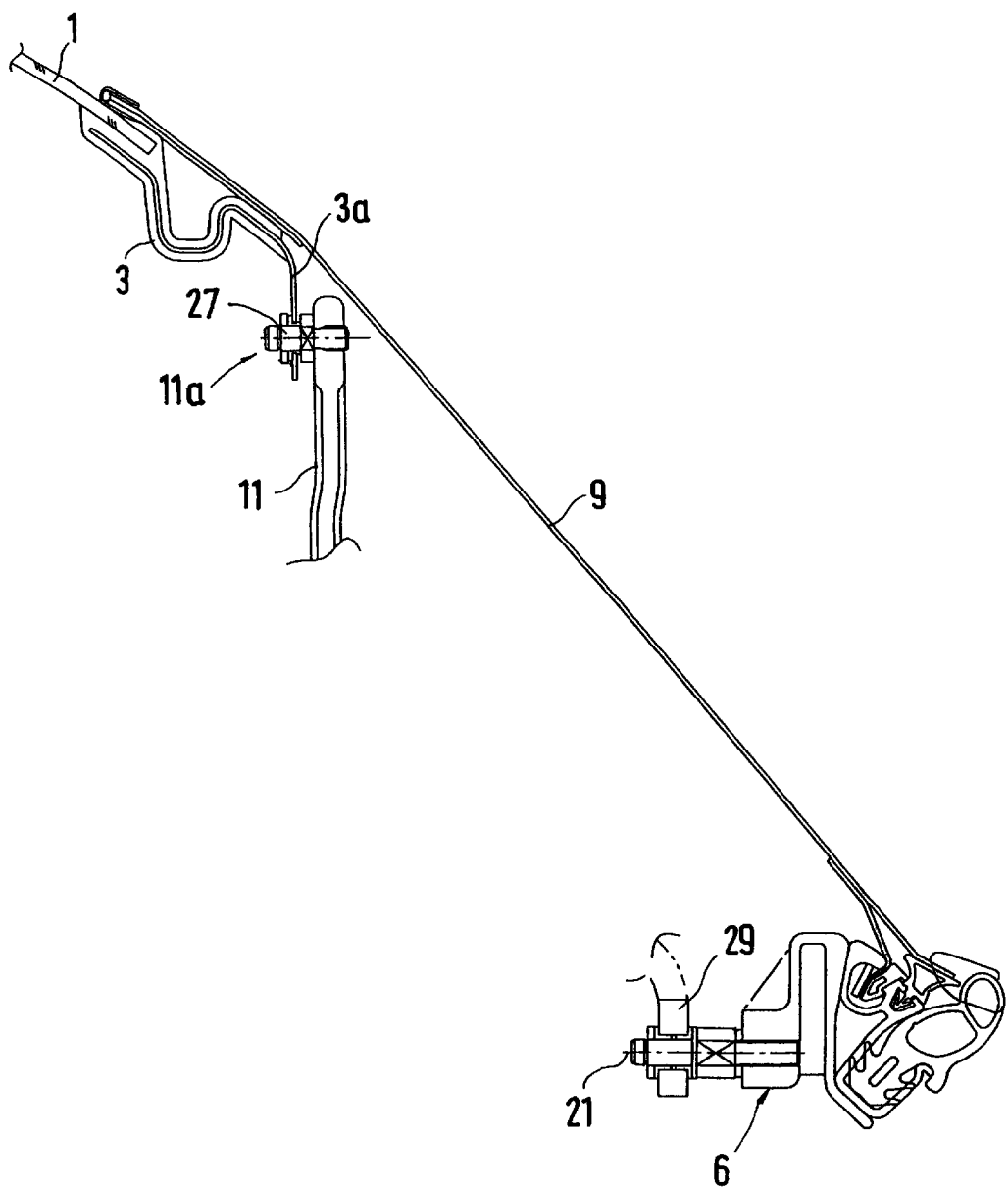
FIG. 7 is a frontal view of the bearing of the steering levers as well as the linkage of the tensioning hoop with the control arm.
Figure 13:
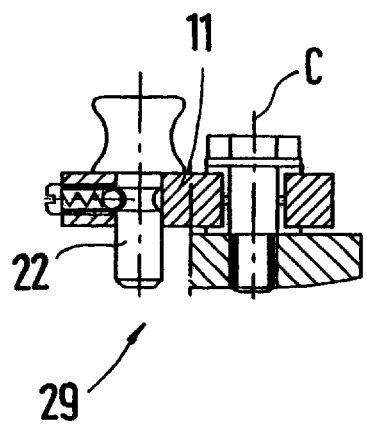
FIG. 13 is a sectional view of a locking element as seen along line XIII—XIII of FIG. 5.

FIG. 5, in conjunction with FIG. 13, shows a locking device 20 between the two steering levers 10, 11. This device 20 permits swivelling of the rear window 1 into a servicing position III according to FIG. 4. In the servicing position III, the rear window 1 is swivelled about the bearings 4, 5 together with the tensioning hoop 6 in the driving direction F such that an engine compartment is accessible.

The locking device 20 comprises essentially a pin 22 in the upper steering lever 11 which reaches under a locking lever 23 and which is removed to the servicing position III and permits a swivelling-back of the rear window 1 without impairing the steering levers 10, 11 in the driving direction F.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A lowerable rear window for a folding top in a motor vehicle, the rear window being changeable from a closed folding top position into a lowered folding top position, comprising:

bearing points by which at least one horizontal bearing axis is formed at a lower transversely extending edge of the rear window and about which the rear window is swivelable on a body side, and at least one steering lever provided between the lateral edges of the rear window and the vehicle body, on each side, for supporting guidance of the rear window into individual positions, wherein said rear window is a solid glass window, wherein the solid glass window includes a rearward transversely extending edge which reaches under a vehicle body element and a sealing device is provided between said vehicle body element and the edge to provide sealing in the closed folding top position, wherein the at least one steering lever is one of plural steering levers swivellably connected with one another by way of a bolt axis and a pin locking device links the at least one steering lever to another of the plural steering levers, wherein the pin locking device has a locking lever which is provided on the at least one steering lever, and wherein said locking lever engages with a pin that can be pulled out so that, when the pin is pulled out, a servicing position can be adjusted and, when the pin is inserted, said closed and said lowered folding top positions can be adjusted.

2. A lowerable rear window for a folding top in a motor vehicle, the rear window being changeable from a closed folding top position into a lowered folding top position, comprising:

bearing points by which at least one horizontal bearing axis is formed at a lower transversely extending edge of the rear window and about which the rear window is swivelable on a body side, and at least one steering lever provided between the lateral edges of the rear window and the vehicle body, on each side, for supporting guidance of the rear window into individual positions, wherein the rear window has an upper transversely extending edge which rests on a leg of a corner hoop in a sealing manner in the closed folding top position, and wherein, in an upper section, the lateral edges of the rear window have a contacting connection with fabric of the folding top and, in the lower section, the rear window is fixedly connected with the fabric of the folding top.

3. A lowerable rear window for a folding top in a motor vehicle, the rear window being changeable from a closed folding top position into a lowered folding top position, comprising:

bearing points by which at least one horizontal bearing axis is formed at a lower transversely extending edge of the rear window and about which the rear window is swivelable on a body side, and at least one steering lever provided between the lateral edges of the rear window and the vehicle body, on each side, for supporting guidance of the rear window into individual positions, wherein the edges of the rear window are constructed as a window frame, wherein the window frame is arranged between a folding top compartment lid of the vehicle body and a transversely extending tensioning hoop linked to the vehicle body, and wherein said window frame rests on a face side against a sealing device of the tensioning hoop, a transversely extending edge of the folding top compartment lid being connected on an underside with the sealing device.

4. The lowerable rear window according to claim 3, wherein the tensioning hoop is swivellably linked to a side of the vehicle body by way of bearing devices laterally provided on the vehicle body by way of levers, and wherein the bearing points by which the at least one horizontal swivelling axis is formed are provided on the tensioning hoop.

* * * * *